United States Patent
Robinson et al.

(10) Patent No.: US 6,907,045 B1
(45) Date of Patent: Jun. 14, 2005

(54) METHOD AND APPARATUS FOR DATA-PATH CONVERSION COMPRISING PCM BIT ROBBING SIGNALLING

(75) Inventors: Bruce W. Robinson, Stirling (CA); Ick Don Lee, Belleville (CA)

(73) Assignee: Nortel Networks Limited, Montreal (CA)

( * ) Notice: Subject to any disclaimer, the term of this patent is extended or adjusted under 35 U.S.C. 154(b) by 916 days.

(21) Appl. No.: 09/714,280

(22) Filed: Nov. 17, 2000

(51) Int. Cl.[7] .............................. H04J 3/06; H04J 3/16
(52) U.S. Cl. ...................... 370/466; 370/514; 375/368; 708/212
(58) Field of Search ................................ 370/231, 252, 370/395.52, 395.1, 352, 356, 442, 401, 466, 514; 375/355, 368; 340/3.1; 379/88.17; 704/212; 708/212

(56) References Cited

U.S. PATENT DOCUMENTS 5,228,036 A * 7/1993 Okamoto et al. ........ 370/105.1
6,272,194 B1 * 8/2001 Sakamoto ................... 375/368
6,728,239 B1 * 4/2004 Kung et al. ................. 370/352

* cited by examiner

*Primary Examiner*—Duc Ho
(74) *Attorney, Agent, or Firm*—Ridout & Maybee LLP (57) ABSTRACT

A method and apparatus for triggering data-path conversion utilizing PCM bit robbing signalling. The method and apparatus permits the pass-through of compressed voice packets over a PCM stream between dissimilar interconnected networks or dissimilar payload specifications in the interconnected networks, and also provides the capability to convert the packets to a different payload specification between the networks. Once a voice path is established between the two networks, the incoming PCM data stream is monitored for a voice synchronization pattern which appears periodically in a predetermined bit position in the PCM samples. Upon detection of a matching voice synchronization pattern, a pass-through mode for the voice data between the networks is initiated. A data or payload conversion operation may also be initiated on detection of the matching voice synchronization pattern.

22 Claims, 5 Drawing Sheets

METHOD AND APPARATUS FOR DATA-PATH CONVERSION COMPRISING PCM BIT ROBBING SIGNALLING

FIELD OF THE INVENTION

The present invention relates to digital networks and voice/data communication systems, and more particularly to a method and apparatus for providing data-path conversion comprising PCM bit robbing signalling.

BACKGROUND OF THE INVENTION

One of the challenges for worldwide communication networks is the integration of different types of conventional communication networks and new network architectures into one consolidated network as seen by a user. The goal is to provide users with a unified network spanning the globe. But to provide unified networks, data must be able to pass seamlessly from one network to the other networks and the same data quality must be achieved as would be in a single independent network.

To achieve these objectives, the problems of degradation of voice data quality and network delay must be avoided. Degradation of the voice data occurs as a result of the decompressing and compressing processes in the voice encoder and decoder (CODEC) devices in the switching equipment and are unavoidable when coupling two different types of networks together where compression is needed. Extra network delay is typically introduced by the jitter buffer in each network gateway node. In known manner, the gateway node and jitter buffer provide a mechanism for coupling together two dissimilar networks.

The connection of two dissimilar types of networks, for example an Asynchronous Transfer Mode (ATM) network and an Internet Protocol (IP) network, results in the degradation of voice quality. Some voice quality degradation occurs even if the same voice CODEC design is used on both sides. The technique of Tandem Pass Through (TPT) has been applied to address the problem of voice quality degradation due to the compress/decompress operations. In addition to voice quality degradation, there is problem of accommodating the differences in data payload specifications between the dissimilar types of networks. While TPT can be effective in addressing the voice quality degradation problem, differences in the data payload specifications still give rise to intercompatibility problems.

Accordingly, there remains a need for a mechanism to handle the differences in payload specifications for interconnecting dissimilar networks.

BRIEF SUMMARY OF THE INVENTION

The present invention provides a method and apparatus for data-path conversion between dissimilar networks or dissimilar payload specifications. The method and apparatus according to the invention includes selective PCM bit robbing signalling.

According to one aspect of the invention, the mechanism according to the present invention permits the pass-through of compressed voice packets over a PCM stream between dissimilar interconnected networks, or interconnected networks with dissimilar payload specifications, and also provides the capability to convert the packets to a different payload specification.

In a first aspect, the present invention provides a method for providing conversion of a data stream between two or more communication networks in a communication system, the method comprises the steps of: (a) establishing a data path between the communication networks for receiving and transmitting data stream; (b) monitoring the data stream on the data path between the communication networks for detecting a recognizable pattern in the data stream, the recognizable pattern providing information for converting the data stream into a form suitable for the communication networks; (c) determining whether the recognizable pattern matches a predetermined pattern corresponding to the data stream; (d) if the recognizable pattern matches the predetermined pattern, applying a data conversion operation, and said data conversion operation converting data in the data stream into a form suitable for transmission between the communication networks.

In another aspect, the present invention provides a system for providing conversion of a data stream between a dissimilar communication network and another communication network or a dissimilar payload specification between interconnected networks in a communication system, the system comprises: (a) a bridge for coupling the dissimilar communication network to the other communication network, and the bridge providing a data path for the data stream between the communication networks; (b) a component for monitoring the data stream and a component for detecting a predetermined pattern appearing in the data stream; and (c) a component responsive to detection of the predetermined pattern for applying a data conversion operation to convert data in the data stream into a form suitable for transmission between the communication networks.

In a further aspect, the present invention provides a communication system for providing conversion of a data stream between a dissimilar communication network and another communication network in a communication system, the system comprises: (a) means for coupling the dissimilar communication network to the other communication network, and the coupling means includes means for providing a data path for the data stream between the communication networks; (b) means for monitoring the data stream and means for detecting a predetermined pattern appearing in the data stream; and (c) means responsive to detection of the predetermined pattern for applying a data conversion operation to convert the data stream into a form suitable for transmission between said communication networks.

BRIEF DESCRIPTION OF THE DRAWINGS

Reference will now be made to the accompanying drawings, which show, by way of example, a preferred embodiment of the present invention, and in which:

FIGS. 3(i) and 3(ii) show in flowchart form a process for triggering data-path conversion utilizing PCM bit robbing signalling according to the present invention.

DETAILED DESCRIPTION OF THE PREFERRED EMBODIMENT

Figure 1:
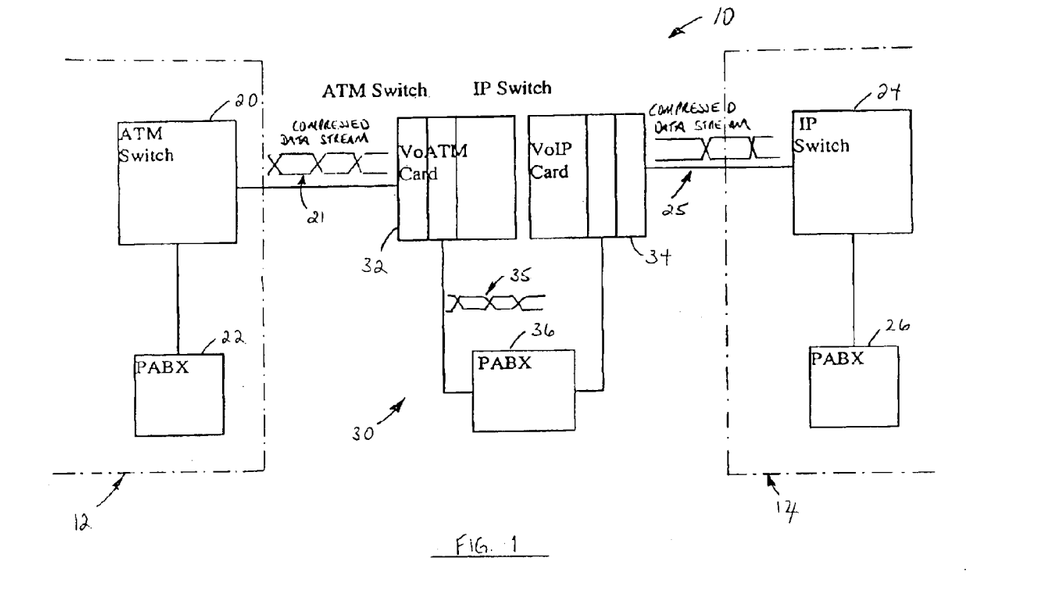
FIG. 1 shows in block diagram form a system utilizing data-path conversion with PCM bit robbing signalling according to the present invention.

Reference is first made to FIG. 1, which shows in diagrammatic form an interconnected network utilizing data-path conversion with PCM bit robbing signalling according to the present invention and indicated generally by reference 10. The interconnected network 10 shown in FIG. 1 comprises an ATM (Asynchronous Transfer Mode) network 12 and an Internet Protocol (IP) network 14. In the following description, the interconnected network 10 is described in the context of an Internet telephony pass-through application. However, it will be understood that the mechanism according to the present invention has wider applicability to other types of pass-through operations between dissimilar interconnected networks (i.e. dissimilar transport layers), or between interconnected networks having dissimilar payload specifications. As will be described, the mechanism according to the present invention permits the pass-through of compressed voice packets over a PCM stream between dissimilar interconnected networks, or interconnected networks with different payload specifications, and also provides the capability to convert the packets to a different payload specification.

As shown in FIG. 1, the exemplary ATM network 12 comprises an ATM switch 20 and a private automated branch exchange (PABX) 22. The exemplary IP network 14 comprises an IP switch 24 and a private automated branch exchange (PABX) 26.

As also shown in FIG. 1, a bridge indicated generally by reference 30 couples the ATM network 12 and the IP network 14. The bridge 30 is implemented as intermediate tandem switches and comprises an ATM voice or VoATM card 32 and an Internet Protocol voice or VoIP card 34. The VoATM 32 and the VoIP card 34 are coupled together through a cable (not shown) or a PABX 36 as shown. A principal requirement of the bridge component 30 is provide a clear data path stream between the interconnected networks. The VoATM card 32 functions as an intermediate ATM switch, and the VoIP card 34 functions as an intermediate IP switch. The VoATM card 32 receives/transmits a compressed data stream 21 (for example, according to the G.726, G.728 or G.729 protocols) to the ATM switch 20. Similarly, the VoIP card 34 receives/transmits a compressed data stream 25 to the IP switch 24 in the IP network 14.

Figure 2A:
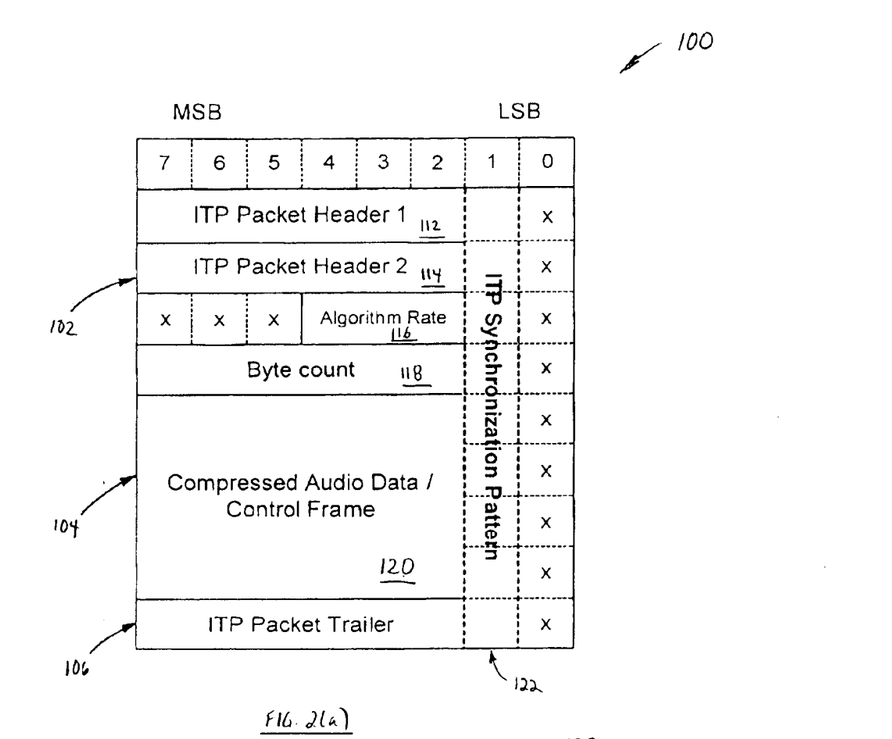
FIG. 2(a) shows in schematic form an ITP transport protocol according to another aspect of the present invention.
Figure 2B:
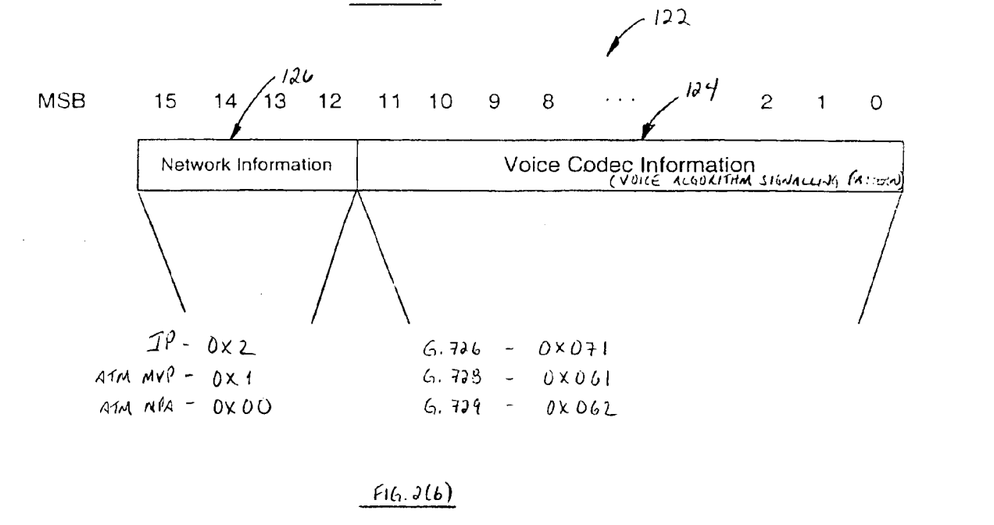
FIG. 2(b) shows in schematic form an ITP synchronization pattern according to another aspect of the present invention.

The Internet telephony pass-through (ITP) mode is used to transport compressed ITP packet format data according to an ITP packet format as shown in FIG. 2(a). The ITP packet format comprises sending and receiving 6 bits per byte of packet data and comprises header, trailer, and synchronization words. Both the VoATM card 32 and the VoIP card 34 are provisioned to insert an ITP voice synchronization pattern (as shown in FIG. 2(b)) as described in more detail below. The ITP voice synchronization pattern is implemented as a 16-bit pattern which describes the voice algorithm being utilized in the call and also carries network information.

Once a voice path is established between the two networks 12 and 14, the VoATM card 32 (i.e. intermediate ATM switch) and the VoIP card 34 (i.e. intermediate IP switch) monitor an incoming PCM voice data stream, denoted by reference 35 in FIG. 1, to detect the voice synchronization pattern in the PCM voice data stream 35, and determine whether the detected voice synchronization pattern matches the current voice algorithm. As will be described in more detail below, based on the detection of a matching voice synchronization pattern, the Internet telephony pass-through mode engages a data conversion process. The data path conversion and tandem pass-through between the ATM 12 and IP 14 networks occurs when both of the networks 12 and 14 are running the same voice CODEC devices. There is no other processing performed on the voice data since the intermediate switches 32 and 34 function as a compressed data flow-through. The actual voice decompression processing is performed by the end-point switches, i.e. the ATM switch 20 and the IP switch 24.

Detection of the synchronization pattern according to the ITP process comprises three principal states: (1) a monitoring state; (2) a synchronizing state; and (3) an active state. The monitoring state comprises monitoring the PCM stream 35 for each voice channel for the expected voice synchronization pattern or algorithm. In the PCM stream 35 for each voice channel, the ITP voice synchronization pattern is generated in every $31^{st}$ voice sample. The synchronizing state is entered when the voice synchronization (i.e. 16-bit) pattern is detected in the $31^{st}$ voice samples in the PCM stream 35. In the synchronizing state, the ITP process sends the same or current voice synchronization pattern in every voice sample in the PCM stream. The active state is entered on the detection of the voice synchronization pattern in every voice sample space. In the active state, the tandem switches, i.e. the VoATM 32 and the VoIP 34 cards, operate in full Internet telephony pass-through mode.

Figure 2C:
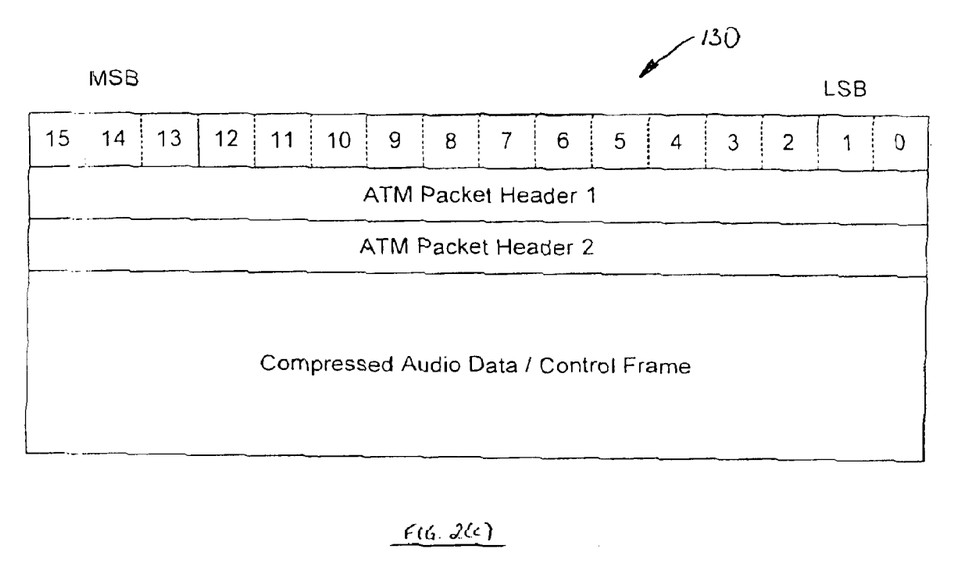
FIG. 2(c) shows in schematic form an ATM transport protocol.

For the ITP active state, data is transferred according to a transport protocol. The transport protocol comprises an ITP frame or packet 100 as shown in FIG. 2. Referring to FIG. 2, the ITP frame 100 includes an ITP header 102, an ITP body 104, and an ITP frame trailer 106. The ITP header 102 contains header identifiers 112 and 114, information on the message types 116, and byte count 118. The byte count 118 describe the number of bytes in the ITP frame or packet 100. The ITP frame trailer 106 is provided to maintain the speed of the PCM data stream 35 (FIG. 1). The ITP body 104 in the frame 100 contains compressed voice data and/or control frames 120. In operation during the ITP active state, the ITP frame 100 transparently passes the compressed data and control frames, for example an ATM voice packet 130 as shown in FIG. 2(c), to the PABX 36. This format involves sending and receiving 6 bits/byte packet of data with header, trailer and sync word.

Figure 3:
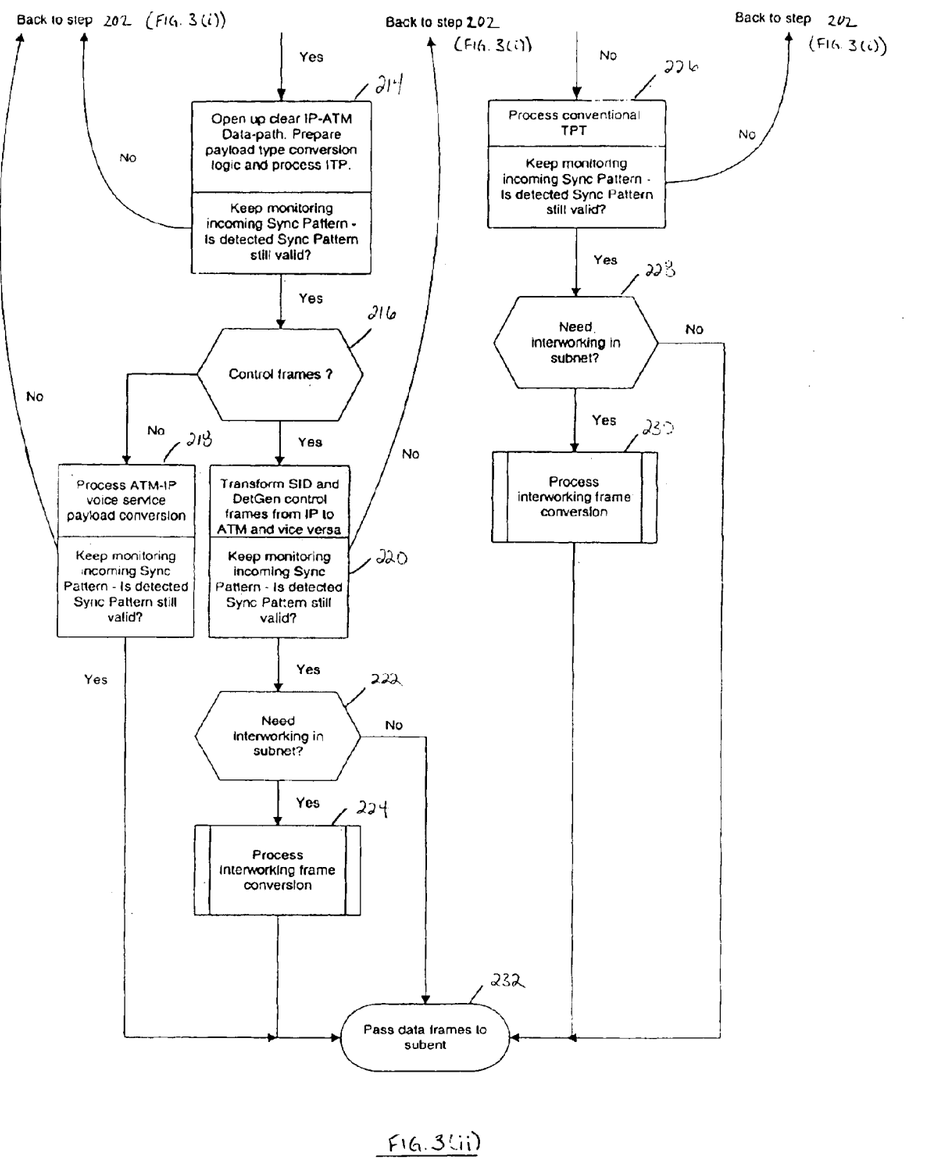
Figure 3I:
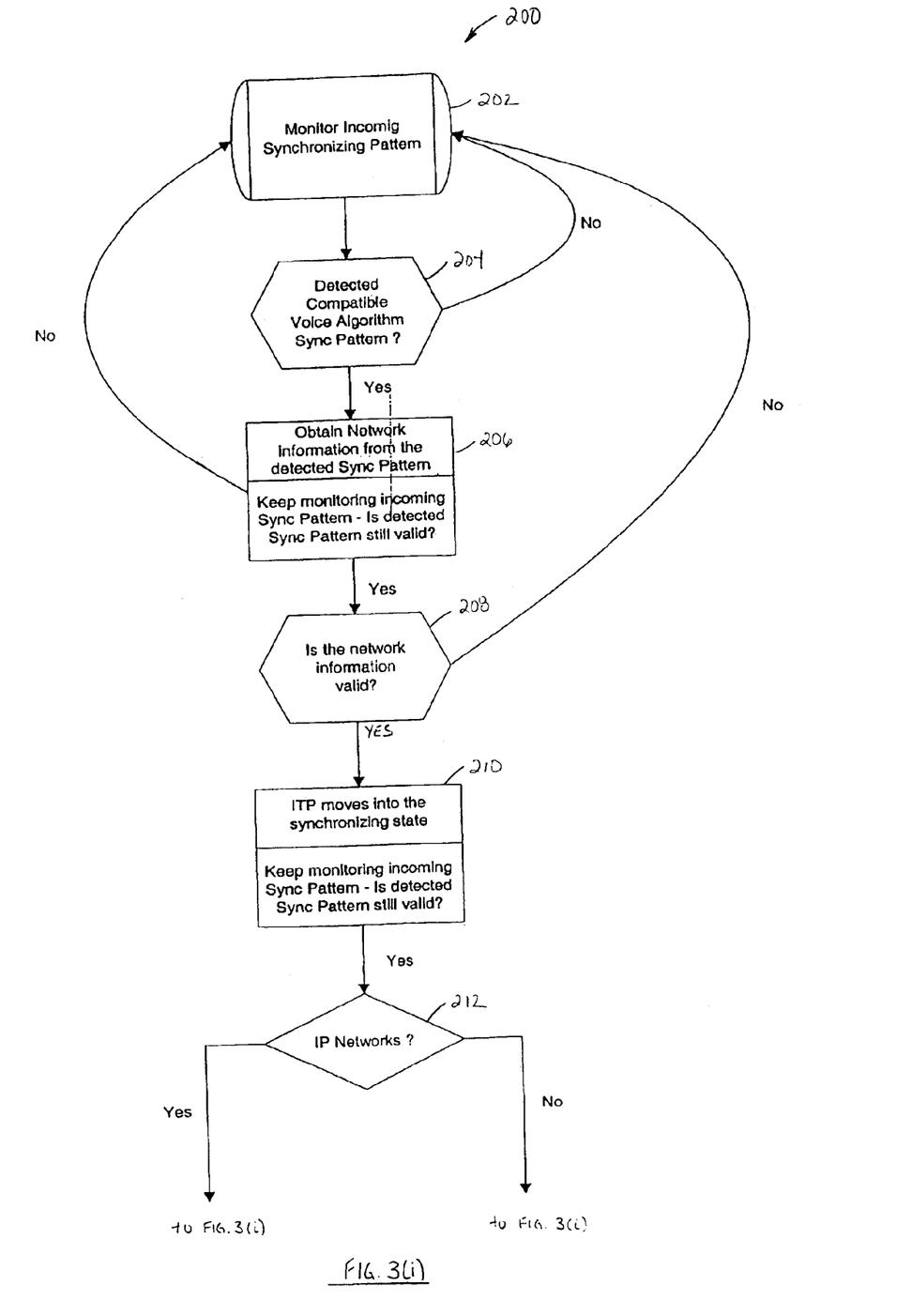

Reference is next made to FIGS. 3(i) and 3(ii) which show in flowchart form an Internet telephony pass-through (ITP) process according to the present invention, and indicated generally by reference 200. The ITP process 200 incorporates triggering data-path conversion comprising PCM bit robbing signalling as will be described. While the ITP process 200 is described in the context of dissimilar interconnected networks, for example an ATM network and an IP network, the process 200 is equally applicable to interconnected networks having dissimilar payload specifications, for example, an IP network to IP network running different voice compression/decompression devices.

As shown in FIG. 3(i), the first step in the ITP process 200 indicated by block 202 involves monitoring incoming packets for an ITP voice synchronization pattern 122 as shown in FIG. 2(b). The ITP process 200 preferably operates on two kinds of facilities: (a) robbed bit facilities or DS1, and (b) clear channel facilities or E1. To accommodate both of these facilities, the ITP process 200 sends and detects its signalling pattern, i.e. the voice synchronization pattern 122, in the second least significant bit as indicated in FIG. 2(a). This arrangement allows the second least significant bit to be utilized for robbed bit signalling. The frequency of the robbed bit signalling depends on the ITP state mode for the channel. If the channel is in the ITP monitoring state, the robbed bit signalling occurs every 31 samples. If the channel is in the ITP synchronizing state or the ITP active state, then the robbed bit signalling occurs every sample. In ITP active tandem mode, the channels are both transmitting and receiving compressed voice data in the PCM stream 35.

As shown in FIG. 2(b), the ITP voice synchronization pattern 122 includes two bit fields denoted by references 124 and 126, respectively. The first bit field 124 comprises the lower 12 bits and the second bit field 124 comprises the highest 4 bits. The first bit field 124 specifies the current voice algorithm (e.g. G.726), and the second bit field 126 specifies the network information. The current voice algorithm is specified as a bit pattern, for example, the bit pattern "0X071" indicates the G.726 protocol, the bit pattern "0X061" indicates the G.728 protocol, and the bit pattern "0X062" indicates the G.729 protocol. The network information is specified in the second bit field 126, for example, the bit pattern "0X2" indicates an IP network, the bit pattern "0X1" indicates an ATM MVP (Nortel) network, and the bit pattern "0X00" indicates an ATM MPA (Nortel) network.

The second step in the ITP process 200 indicated by decision block 204 comprises detecting a compatible voice algorithm or voice synchronization pattern. On detection of a compatible voice synchronization pattern in block 204, the ITP method 200 retrieves the network information from the 4-bit field 126 (FIG. 2(b)) of the voice synchronization pattern and continues to monitor the incoming synchronization patterns to determine if the synchronization pattern is valid as indicated in block 206. Next in block 208, the validity of the network information extracted from the 4-bit pattern is determined and if not valid, the processing steps from block 202 are repeated. If the 4-bit network information is valid, then processing moves to block 210.

In block 210, after detecting a compatible voice synchronization pattern, and the 4-bit network information, the ITP process 200 moves in the ITP synchronizing state mode. In the synchronizing state mode, the ITP process 200 transmits the same voice synchronization pattern in every PCM sample of the PCM stream 35, while the transmit and the receive channels on the TDM side are still in the PCM format. To minimize the possibility of falsely switching to the ITP active state mode from the ITP synchronizing state, the incoming synchronization pattern is continuously monitored, and a synchronization loss is determined if more than one bit error is detected in the voice synchronization pattern.

In block 212, the ITP process 200 determines whether the network connection comprises a dissimilar network connection (for example, an Internet Protocol (IP) network to ATM network connection) or a similar network connection (for example, an Internet network to Internet network connection, or an ATM network to ATM network connection), or if the network connection comprises interconnected networks (for example an IP network to IP network connection) with dissimilar payload specifications. If the network connection comprises a dissimilar network connection or dissimilar payload specification, then the ITP process 200 moves to block 214. On the other hand, if the network connection comprises a similar network connection, the ITP process 200 moves to block 226 as described below.

In block 214, the ITP process 200 opens a clear IP and ATM data-path on the detection of a compatible IP network synchronization pattern on every sample, and prepares the payload type conversion logic. This allows the tandem channels to send and receive ITP frames containing compressed data through the PABX 36, while at the same time sending one bit of the synchronizing pattern in the second least significant bit (LSB) position, i.e. the "robbed bit", in every PCM sample in the PCM stream 35.

On detection of a recognizable voice synchronization pattern, the ITP process 200 tells the DSP software to stop the decompression process and pass through the compressed voice packets. The voice packets are passed via the ITP packets in the PCM stream 35. In block 216, a check is made for control frames in block 216. If there are no control frames present, then ATM-IP voice service payload conversion is performed in block 218. With reference to FIG. 1, the VoATM card 32, the voice synchronization pattern initiates a gateway function to convert the VoATM packets from one voice specification to the VoIP payload specification, and vice versa. Referring back to FIG. 3, the ITP process 200 keeps monitoring the incoming voice synchronization pattern to determine its validity as indicated in block 218. Provided the voice synchronization pattern is valid, the data frames are passed to the sub-network or sub-net as indicated in block 232. For the control frames, additional processing is performed as indicated in block 220. The additional processing comprises DTMF detection and regeneration (DetGen) or Silence Suppression Indications (SID) between the two formats as will be familiar to those skilled in the art. As will be within the understanding of one skilled in the art, the protocols G.729 or G.729 annex A, with the Nortel Networks Speech Activity Detector or SAD and Comfort Noise Generator or CNG components, will not properly function with the G.729 annex B protocol because of differences in the SID format and in the information content in the SID. The ITP process 200 preferably includes a SID conversion component between the Speech Activity Detector component and G.729 annex B, to provide compatibility between the G.729 or G.729A with Nortel SAD and the G.729 annex B protocols.

Next in blocks 222 and 224, frame conversion for interworking on the sub-network is performed. The data frames are then passed to the sub-network as indicated in block 232.

Referring again to FIG. 3, if the network connection comprises an ATM network, then the ITP process 200 moves to block 226. As indicated in block 226, conventional Tandem Pass Through or TPT processing is performed to transmit the compressed data between the networks. As also indicated in block 226, the ITP process 200 monitors the synchronization pattern and if the synchronization pattern becomes invalid, then the ITP process 200 leaves the active mode on the detection of the invalid synchronization pattern and commences to transmit and receive the PCM data, and the processing steps from block 202 are repeated. In block 228, the ITP process 200 checks if frame conversion is required for interworking in the sub-network. If frame conversion for interworking is not required, then the data frames are passed to the sub-network as indicated in block 232. On the other hand, if required, the frame conversion is performed as indicated in block 230, prior to the data frames being passed to the sub-network (block 232).

The ITP process 200 is provisioned in the bridge 30 comprising the voice network cards, e.g. the VoATM card 32 and the VoIP card 34, to perform the functions as described above, with the specific implementation details being apparent to one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for providing conversion of a data stream between two or more communication networks in a communication system, said method comprising the steps of:
   (a) establishing a data-path between said communication networks for receiving and transmitting a data stream;
   (b) monitoring said data stream on the data-path between said communication networks for detecting a recognizable pattern in said data stream, said recognizable pattern providing information for converting the data stream into a form suitable for transmission between the communication networks;
   (c) determining whether said recognizable pattern matches a predetermined pattern corresponding to the data stream; and
   (d) if said recognizable pattern matches the predetermined pattern, applying a data conversion operation, and said data conversion operation converting data in the data stream into a form suitable for transmission between the communication networks.

2. The method as claimed in claim 1, further including the step of providing a pass-through mode to transmit the data stream between the communication networks.

3. The method as claimed in claim 2, wherein said recognizable pattern comprises first and second bit fields, said first bit field providing data encoding information, and said second bit field providing network information.

4. The method as claimed in claim 3, wherein said first bit field comprises 12 bits and said data encoding information specifies a voice algorithm, and wherein said second bit field comprises 6 bits for specifying said network information.

5. The method as claimed in claim 3, wherein said recognizable pattern appears periodically in the data stream, and said data conversion operation comprises the step of entering a synchronizing state upon detection of said recognizable pattern.

6. The method as claimed in claim 5, wherein said synchronizing state comprises repeating said recognizable pattern in every data sample in said data stream, and the repeated recognizable pattern in said data stream providing a mechanism for synchronizing the transmission of data between the two communication networks.

7. The method as claimed in claim 6, further including the step of entering an active state in response to the repeated recognizable pattern appearing in said data stream, and said active state comprising transmitting the data stream between the two communication networks according to a transport protocol.

8. The method as claimed in claim 1, wherein said data stream includes a plurality of PCM samples, and said recognizable pattern is formed as a plurality of bits, each of said bits occupying a predetermined position in said PCM samples.

9. The method as claimed in claim 8, wherein the bits for said recognizable pattern appear periodically in said PCM samples.

10. The method as claimed in claim 9, wherein the bits for said recognizable pattern appear in every $31^{st}$ PCM sample in the data stream, and said periodic appearance in every $31^{st}$ PCM sample corresponds to a monitoring state.

11. The method as claimed in claim 9, wherein the bits for said recognizable pattern appear in every PCM sample in the data stream, and the bits for said recognizable pattern correspond to a synchronizing state, wherein the PCM samples are transferred between the communication networks according to a transport protocol.

12. In a communication system comprising two or more communication networks, with at least one of said communication networks having a dissimilar transport protocol or a dissimilar data stream payload specification, a system for providing conversion of a data stream between said two or more communication networks, said system comprising:
   (a) a bridge for coupling said two or more communication networks, and said bridge providing a data-path for the data stream between said two or more communication networks;
   (b) a component for monitoring said data stream and a component for detecting a predetermined pattern appearing in said data stream; and
   (c) a component responsive to detection of said predetermined pattern for applying a data conversion operation to convert data in the data stream into a form suitable for transmission between said two or more communication networks.

13. The system as claimed in claim 12, further including a component for initiating a pass-through operation to enable transmission of data between said two or more communication networks.

14. The system as claimed in claim 13, wherein said predetermined pattern comprises first and second bit fields, said first bit field providing data encoding information, and said second bit field providing network information.

15. The system as claimed in claim 14, wherein said first bit field comprises 12 bits and said data encoding information specifies a voice algorithm, and wherein said second bit field comprises 6 bits for specifying said network information.

16. The system as claimed in claim 14, wherein said predetermined pattern appears periodically in the data stream, and said component for initiating a pass-through operation comprises a component for repeating said predetermined pattern in every data sample in said data stream for synchronizing said two or more communication networks.

17. The system as claimed in claim 16, further including a component for transferring data between said two or more communication networks according to a transport protocol, said component being responsive to the appearance of the repeated predetermined pattern in said data stream.

18. The system as claimed in claim 17, wherein said data stream includes a plurality of PCM samples, and said recognizable pattern is formed as a plurality of bits, each of said bits occupying a predetermined position in said PCM samples, and said recognizable pattern appearing periodically in said PCM samples.

19. A communication system for providing conversion of a data stream between a first communication network and a second dissimilar communication network in a communication system, said system comprising:
   (a) means for coupling said first communication network to said second dissimilar communication network, and said coupling means including means for providing a data-path for the data stream between said first communication network and said second dissimilar communication network;
   (b) means for monitoring said data stream and means for detecting a predetermined pattern appearing in said data stream; and
   (c) means responsive to detection of said predetermined pattern for applying a data conversion operation to convert the data stream into a form suitable for transmission between said first communication network and said second dissimilar communication network.

20. The communication system as claimed in claim 19, further including means for initiating a pass-through operation to enable transmission of the data stream between said first communication network and said second dissimilar communication network.

21. The communication system as claimed in claim 20, wherein said predetermined pattern comprises first and second bit fields, said first bit field providing data encoding information, and said second bit field providing network information.

22. The communication system as claimed in claim 21, wherein said first bit field comprises 12 bits and said data encoding information specifies a voice algorithm, and wherein said second bit field comprises 6 bits for specifying said network information.

* * * * *